(12) United States Patent
Ichioka

(10) Patent No.: US 7,947,408 B2
(45) Date of Patent: May 24, 2011

(54) COLLECTING PLATE, FUEL CELL, AND METHOD FOR MANUFACTURING SAME

(75) Inventor: Tadahiro Ichioka, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1180 days.

(21) Appl. No.: 11/631,169

(22) PCT Filed: Jul. 19, 2005

(86) PCT No.: PCT/JP2005/013542
§ 371 (c)(1),
(2), (4) Date: Dec. 29, 2006

(87) PCT Pub. No.: WO2006/009277
PCT Pub. Date: Jan. 26, 2006

(65) Prior Publication Data
US 2007/0287053 A1    Dec. 13, 2007

(30) Foreign Application Priority Data

Jul. 22, 2004  (JP) ................. 2004-213912

(51) Int. Cl.
*H01M 4/64*    (2006.01)
*H01M 4/66*    (2006.01)
*H01M 8/24*    (2006.01)
*H01M 2/20*    (2006.01)
(52) U.S. Cl. ......... 429/517; 429/519; 429/452; 429/468
(58) Field of Classification Search .......... 429/12, 429/18, 23, 26, 30, 32, 34, 444, 428, 452, 429/456–457, 507–509, 512, 517–520, 522, 429/467; 439/720, 741, 775, 787, 808, 816, 863, 865, 867–868, 870–872, 877–882
See application file for complete search history.

(56) References Cited

U.S. PATENT DOCUMENTS

| | | | |
|---|---|---|---|
| 3,589,941 A * | 6/1971 | Eaton et al. ............ | 429/444 |
| 6,790,554 B2 | 9/2004 | May et al. | |
| 2003/0091884 A1* | 5/2003 | Scartozzi ............ | 429/32 |
| 2004/0209151 A1 | 10/2004 | Hase et al. | |
| 2005/0014049 A1 | 1/2005 | Hart et al. | |
| 2005/0142417 A1* | 6/2005 | Sato et al. ............ | 429/34 |

FOREIGN PATENT DOCUMENTS

| | | |
|---|---|---|
| JP | A 58-78371 | 5/1983 |
| JP | A-04-324248 | 11/1992 |
| JP | A 11-339828 | 12/1999 |
| JP | A 2002-124285 | 4/2002 |
| JP | A 2002-352821 | 12/2002 |
| JP | A 2002-362165 | 12/2002 |
| JP | A 2003-86216 | 3/2003 |
| JP | A 2003-123828 | 4/2003 |
| WO | WO 03/063286 A1 | 7/2003 |
| WO | WO 03/088395 A1 | 10/2003 |

* cited by examiner

*Primary Examiner* — Dah-Wei D Yuan
*Assistant Examiner* — Claire L (Rademaker) Roe
(74) *Attorney, Agent, or Firm* — Oliff & Berridge, PLC

(57) ABSTRACT

The collecting plate of the present invention is used in a stacked fuel cell, and comprises a collecting section and an output terminal that is electrically connected to the collecting section and has a thickness that is greater than the thickness of the collecting section. For example, the output terminal is formed by bending at least part of an output terminal forming portion that is extended from the collecting section, at least one time.

6 Claims, 8 Drawing Sheets

COLLECTING PLATE, FUEL CELL, AND METHOD FOR MANUFACTURING SAME

BACKGROUND OF THE INVENTION

1. Field of the Invention

This invention relates to a collecting plate, a fuel cell, and a method for manufacturing the same.

2. Description of Related Art

Conventional solid polymer electrolyte fuel cells have, for example, individual cells made up of a membrane-electrode assembly (MEA) consisting of an electrolyte membrane composed of an ion exchange membrane, an electrode (anode, fuel electrode) composed of a diffusion layer and a catalyst layer disposed on one side of this membrane, and an electrode composed of a diffusion layer and a catalyst layer disposed on the other side of the electrode membrane, and a separator that forms a channel for supplying fuel gas and oxidizing gas to the anode and cathode, respectively. A plurality of these single cells are stacked, a terminal plate, an insulating plate, and an end plate are disposed in that order on both ends (in the cell stacking direction) of this stack, and these are fastened together and fixed with tension plates (see Patent Documents 1 to 6, for example).

The terminal plates disposed at the stack ends and the separators that are part of the single cells have output terminals, for outputting the voltage generated by the cells, provided to collecting sections (the main part).

Patent Document 1: Japanese Laid-Open Patent Application H11-339828

Patent Document 2: Japanese Laid-Open Patent Application 2003-86216

Patent Document 3: Japanese Laid-Open Patent Application 2003-123828

Patent Document 4: Japanese Laid-Open Patent Application 2002-352821

Patent Document 5: Japanese Laid-Open Patent Application 2002-362165

Patent Document 6: Japanese Laid-Open Patent Application 2002-124285

SUMMARY OF THE INVENTION

As fuel cells have become lighter in weight in recent years, however, there has been an expectation that the collecting plates (separators and terminal plates) will be made thinner. In particular, since high voltage is obtained from stacked fuel cells, terminal plates that are thick enough to collect such high voltage have a large thermal capacity, steal heat generated by adjacent end cells, and tend to adversely affect start-up characteristics at low temperature, so a thinner plate is also desirable from the standpoint of reducing thermal capacity.

However, when collecting plates are made thinner in an effort to achieve a lighter weight, the output terminals provided extending from the collecting sections (the main parts of these collecting plates) also end up being thinner, so there is a decrease in the rigidity of the output terminals, making them more susceptible to damage or deterioration.

In view of this, it is an object of the present invention to provide a collecting plate that has lower weight and lower thermal capacity while retaining good rigidity and high-voltage resistance, and to provide a fuel cell in which this is used, and a method for manufacturing these.

To this end, the collecting plate pertaining to the present invention is one that is used in a stacked fuel cell, and comprises a collecting section and an output terminal that is electrically connected to the collecting section and has a thickness that is greater than the thickness of the collecting section.

With a collecting plate constituted as above, when the thickness of the collecting plate is reduced, the thickness (cross sectional area) required to ensure good rigidity and high-voltage resistance in the output terminal can be maintained by making the output terminal thicker than the collecting section. As a result, it is possible to achieve both light weight and good rigidity and high-voltage resistance.

Also, it is preferable for the output terminal to be provided at an output terminal forming portion that is extended from the collecting section, and it is even better if the output terminal is formed by bending at least part of the output terminal forming portion at least one time.

With this constitution, even when the output terminal and the collecting section are formed integrally, it is still possible to make the output terminal thicker than the collecting section by bending.

More specifically, the collecting section and the output terminal are preferably made of metal.

It is also preferable if the output terminal is formed by bending the output terminal forming portion so that opposing faces come into contact.

With this constitution, since opposing faces are in contact with each other, the thickness of the output terminal is effectively greater than the thickness of the collecting section, and high-voltage resistance tends to be maintained even better.

Even more specifically, it is preferable if the output terminal forming portion has a main part that is extended from the collecting section, and an extension that is extended from this main part, and the output terminal is formed by bending the output terminal forming portion at the boundary between the main part and the extension.

In this case, it is better yet if the output terminal is created by bringing the main part into contact with the extension.

Furthermore, it is even more useful if the cross sectional area of a region continuing from a proximal end side of the main part connected to the collecting section, to the output terminal is at least as great as the cross sectional area of the output terminal, and preferably at least as great as the minimum cross sectional area of the output terminal.

With this constitution, since the cross sectional area of a region continuing from the proximal end side of the main part connected to the collecting section, to the output terminal is at least as great as the cross sectional area of the output terminal, the required cross sectional area can be ensured even in the channel through which the electricity (charge, power) collected by the collecting section flows to the output terminal.

In addition, it is better yet if the main part is formed so that its length on the proximal end side connected to the collecting section is greater than its length on the distal end side.

If this is done, since the length of the proximal end will be greater than the length of the distal end, even if bending does not increase the thickness, the cross sectional area can be increased by increasing the length.

Also, it is preferable if the output terminal forming portion has rigidity increasing means provided to the proximal end connected to the collecting section.

The term "proximal end" here means the boundary region (or boundary line) between the output terminal forming portion and the collecting section in the collecting plate. For instance, in the case of a fuel cell in which a plurality of collecting plates are stacked, the output terminal forming portion is formed so as to extend from the side face of the collecting plate, which is not in contact with an adjacent collecting plate, in a state of non-contact with an adjacent collecting plate. In this case, the boundary region between the output terminal forming portion and the side face of the collecting plate can be interpreted as the "proximal end."

This increases rigidity by reinforcing the proximal end of the output terminal forming portion (that is, the base portion of the output terminal).

This rigidity increasing means may be formed such that the width of the proximal end in the planar direction of the collecting section is greater than the width of the output terminal in the planar direction.

In this case, since the cross sectional area of the proximal end of the output terminal forming portion is enlarged, the rigidity of this portion can be increased.

Alternatively, it is preferable if the rigidity increasing means comprises a protruding member provided so as to protrude from the proximal end.

Here again the proximal end of the output terminal forming portion is reinforced by the protruding member.

More specifically, it is preferable if the main part has a first main part region that is in axial symmetry with the extension and is across from the extension, and a second main part region that is not across from the extension.

With this configuration, since the output terminal is formed by bending and superposing the extension and the part of the main part that is across from the extension so that their shapes match up, working and forming are easier.

Furthermore, it is preferable if the main part is formed such that the second main part region is substantially trapezoidal.

As a result, the length at the proximal end is more certainly greater than the length of the portion on the distal end side, so a large cross sectional area can be ensured at the proximal end.

Also, the fuel cell pertaining to the present invention is equipped with a separator or terminal plate provided with the collecting plate of the present invention.

With a fuel cell constituted in this manner, it is possible to reduce the weight while maintaining good rigidity and high-voltage resistance in the collecting plate.

The method for manufacturing a collecting plate pertaining to the present invention is a method for manufacturing a collecting plate used in a stacked fuel cell, comprising the steps of forming from a sheet member a collecting section and an output terminal forming portion that is extended from part of the collecting section, and forming an output terminal by bending at least part of the output terminal forming portion at least one time.

Furthermore, it is preferable if, in the step of forming the output terminal, the output terminal is formed by bending at least part of the output terminal forming portion at least one time so that the thickness of the output terminal is greater than the thickness of the collecting section.

It is even more useful if the sheet member used in the step of forming an output terminal forming portion is made of metal.

Furthermore, it is preferable if, in the step of forming the output terminal, the output terminal is formed by bending the output terminal forming portion so that opposing faces come into contact.

Also, the method for manufacturing a fuel cell pertaining to the present invention is a method for manufacturing a stacked fuel cell, comprising a step of forming a separator or terminal plate from the collecting plate of the present invention.

In light of the course of events that led to the present invention, the present invention can be viewed from another standpoint as follows.

Specifically, the collecting plate pertaining to the present invention is a collecting plate comprising a collecting section and an output terminal, wherein the thickness of the output terminal is greater than the thickness of the collecting section.

The collecting section is preferably formed as a flat plate or a thin plate.

It is also favorable for there to be an output terminal forming portion that is extended from part of the collecting section, and for the output terminal to be formed by bending the output terminal forming portion.

More specifically, the collecting plate is preferably made of metal.

Furthermore, the output terminal is preferably created by bending the output terminal forming portion so as to bring opposing faces into contact.

It is also preferable if the output terminal forming portion has rigidity increasing means provided to the proximal end connected to the collecting section.

The rigidity increasing means may have a structure in which the width of the proximal end in the planar direction of the collecting section is greater than the width of the output terminal in the planar direction.

Also, the rigidity increasing means may have a structure in which ribs are formed on the proximal end.

Also, the collecting plate pertaining to the present invention is a collecting plate comprising a collecting section and an output terminal, wherein there is an output terminal forming portion that is extended from part of the collecting section, the output terminal forming portion comprises a main part that is continuously extended from part of the collecting section, and an extension that is continuously extended from part of this main part, the output terminal is formed by bending the extension with respect to the main part so that opposing faces come into contact, and the cross sectional area of a region continuing from a proximal end side of the main part connected to the collecting section, to the output terminal is at least as great as the cross sectional area of the output terminal.

Furthermore, it is preferable if the main part is formed so that its length on the proximal end side connected to the collecting section is greater than its length on the distal end side.

Furthermore, it is preferable if the cross sectional area of the continuous region is at least the minimum cross sectional area of the output terminal.

Further, the present invention may be a fuel cell in which the above-mentioned collecting plate is applied to a separator or a terminal plate, or both.

Also, the method for manufacturing a collecting plate pertaining to the present invention is a method for manufacturing a collecting plate comprising a collecting section and an output terminal, comprising the steps of forming from a thin sheet member a collecting section and an output terminal forming portion that is extended from part of the collecting section, and forming an output terminal by bending at the output terminal forming portion.

In the step of forming the output terminal here, the thickness of the output terminal may be greater than the thickness of the collecting section.

It is preferable if the thin sheet member is made of metal.

Furthermore, in the step of forming the output terminal, the output terminal may be formed by bending the output terminal forming portion so that opposing faces come into contact.

Furthermore, the collecting plate may be applied to the separator or terminal plate of a fuel cell, or both of these.

With the present invention, it is possible to obtain a collecting plate with which weight is reduced while good rigidity and high-voltage resistance are maintained, as well as a fuel cell in which this collecting plate is used, and a method for manufacturing these.

DETAILED DESCRIPTION OF PREFERRED EMBODIMENT

Figure 1:
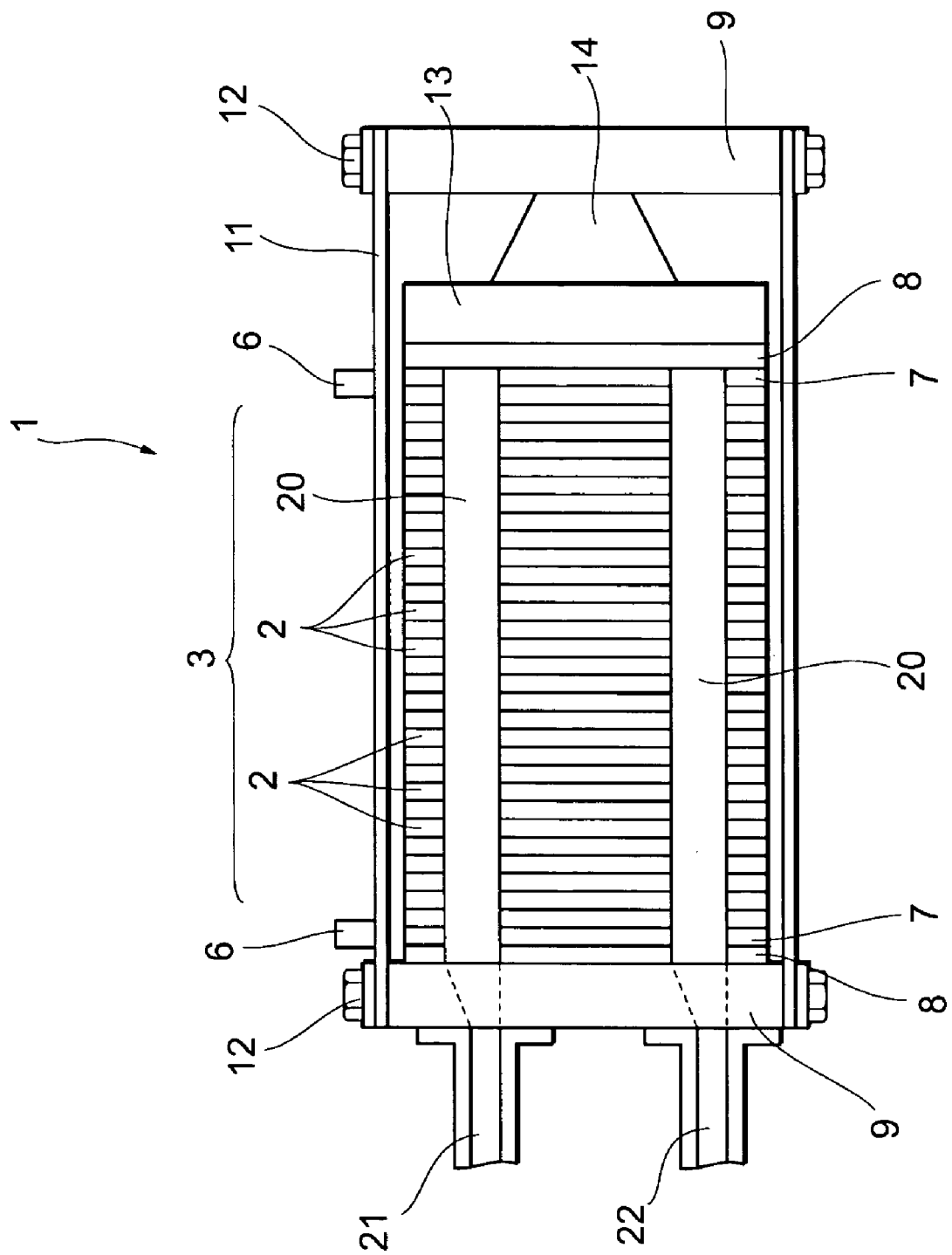
FIG. 1 is a simplified cross section illustrating the main components of a fuel cell comprising a first embodiment of the collecting plate pertaining to the present invention.

Embodiments of the present invention will now be described in detail. Components that are same are numbered the same, and redundant descriptions will be omitted. Unless otherwise specified, the up, down, left, right, and other positional relationships are based on the positional relationships in the drawings. The dimensional proportions of the drawings are not limited to those depicted.

The present invention involves modifying the shape of an output terminal had by a collecting plate, or how it is formed, and this affords a collecting plate with which weight can be reduced while maintaining good rigidity and high-voltage resistance. Furthermore, the collecting plate pertaining to the present invention can be applied to a separator, terminal plate, or the like of a fuel cell, but in the following embodiments, the description will be of application to a terminal plate. A solid polymer type of fuel cell, which is favorable for fuel cell powered vehicles, will be described as an example below.

First Embodiment

Constitution of Fuel Cell

As shown in FIG. 1, a solid polymer type of fuel cell 1 has a stack 3 produced by stacking numerous single cells 2, which are the basic cells. The fuel cell 1 is the product of stacking a terminal plate 7 (collecting plate) with an attached output terminal 6, an insulating plate 8, and an end plate 9, in that order, on the outside of the single cells 2 located at each end of the stack 3.

Tension plates 11 provided spanning the two end plates 9, for example, are fixed by bolts 12 to the end plates 9, so that the fuel cell 1 is in a state in which a specific compressive force is exerted (applied) in the cell stacking direction. A pressure plate 13 and a spring mechanism 14 are provided between the insulating plate 8 and the end plate 9 at one end of the stack 3, so that fluctuations in the load exerted on the single cells 2 are absorbed.

Although not shown in the drawings, the single cells 2 are made up of a MEA (Membrane Electrode Assembly) comprising an electrolyte membrane composed of an ion exchange membrane and a pair of electrodes that sandwich this electrolyte membrane from either side, and a pair of separators that sandwich the MEA from the outside. Each separator has a base material formed from carbon (a carbonaceous material) or metal, and is electroconductive. Also, each separator has a fluid channel for supplying oxidizing gas (oxygen gas, usually air) or fuel gas (hydrogen gas) to the electrodes. With this configuration, an electromotive force is produced by an electrochemical reaction within the MEA of the single cells 2.

Furthermore, with the fuel cell 1, the voltage of the cells 2 that make up the stack 3 is measured in order to detect whether or not the cells 2 are in a normal state. To measure this voltage, an output terminal for measuring cell voltage is provided in a protruding shape to the separator, although not depicted in the drawings.

A fuel gas manifold 20, an oxidizing gas manifold 20, and a coolant manifold 20 are formed in the fuel cell 1, passing through in the cell stacking direction. (These are actually separate components, but are numbered the same and are not described here.) These manifolds 20 for various fluid channels are formed in the fuel cell 1 so that they pass through the end plates 9, the insulating plates 8, the terminal plates 7, and the single cells 2 in the cell stacking direction.

Constitution of Collecting Plate

The terminal plates 7 are provided next to the (separators of the) single cells 2 in the outermost locations of the fuel cell 1. The electricity generated by the single cells 2 of the fuel cell 1 is collected by the terminal plates 7 via the separators of the single cells 2 in the outermost locations of the fuel cell 1, and is taken off from the output terminals 6. The insulating plates 8 are formed from polycarbonate or another such resin material in the form of a plate. The end plates 9 are formed from iron, stainless steel, copper, aluminum, or another such metal in the form of a plate.

The terminal plates 7 can be formed from various metals, the same as the end plates 9, but in this embodiment are formed as copper plates. The terminal plates 7 are also subjected to a surface treatment such as plating on the side closest to the single cells 2. Examples of the plating metal include gold, silver, aluminum, nickel, zinc, and tin, and plating ensures good contact resistance with the single cells 2. For example, in this embodiment, the terminal plates 7 are plated with tin from the standpoints of electrical conductivity, ease of working the material, and lower cost.

Figure 2:
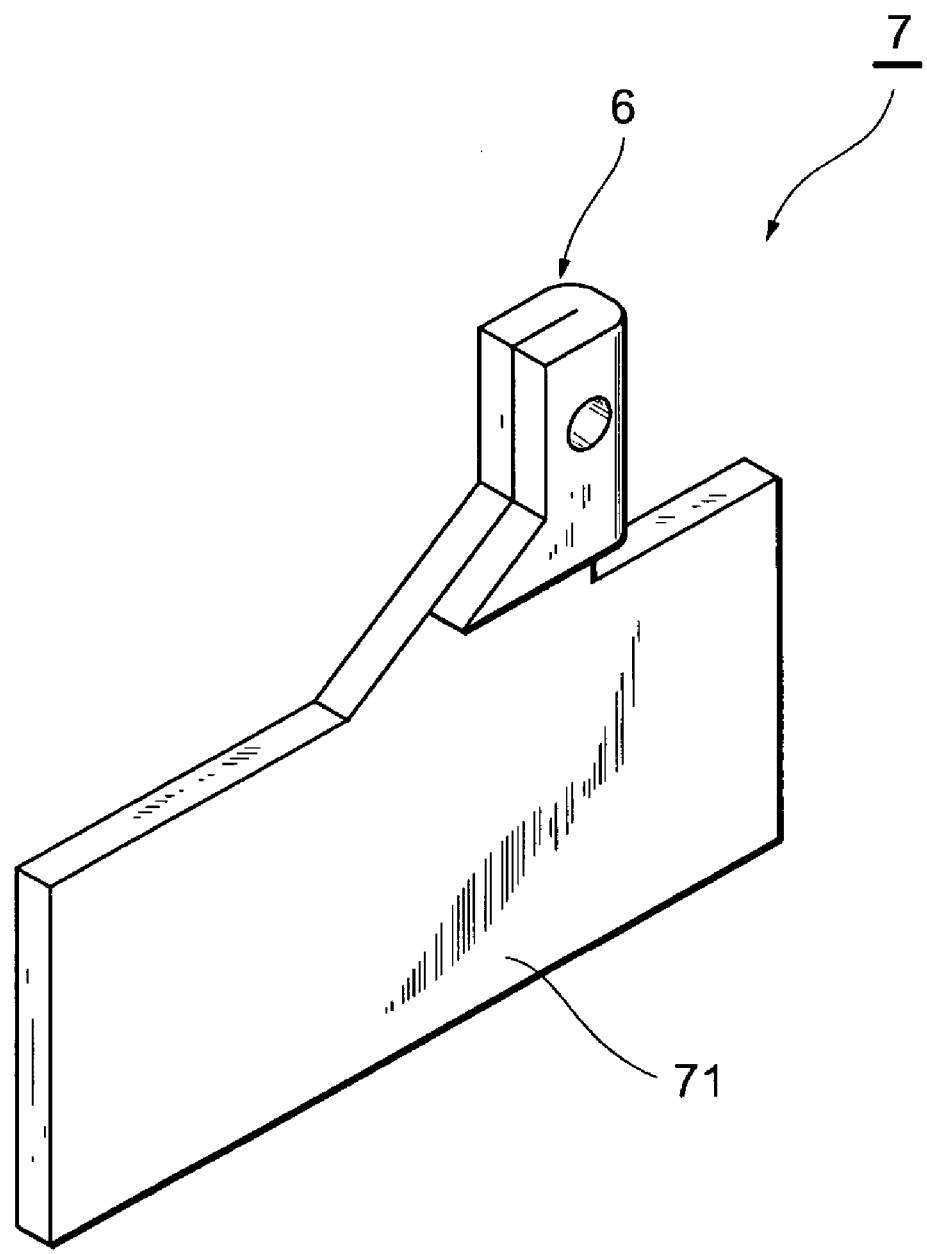
FIG. 2 is an oblique view of a terminal plate in FIG. 1.

As shown in FIG. 2, the terminal plates 7 are each equipped with a collecting section 71 and an output terminal 6. The terminal plates 7 in this embodiment are formed such that the output terminal 6 is thicker than the collecting section 71. The output terminal 6 may be formed integrally with the collecting section 71, or may be produced separately (formed as a separate component) and joined by welding or the like, but in this embodiment it is formed integrally with the collecting section 71 from the standpoints of lower cost, ease of working, and so forth.

The output terminal 6 is formed by bending part of the peripheral edge of the collecting section 71 and crimping the opposing faces together. This bending allows the thickness of the output terminal 6 to be increased even through the collecting section 71 is formed thin, so it is possible to ensure the cross sectional area necessary to maintain high-voltage resistance. For instance, if the thickness of the collecting section 71 is only half the conventional thickness, then part of the peripheral edge can be bent to double the thickness of the output terminal 6 and thereby easily ensure the same cross sectional area of the output terminal 6 as in the past.

Figure 3:
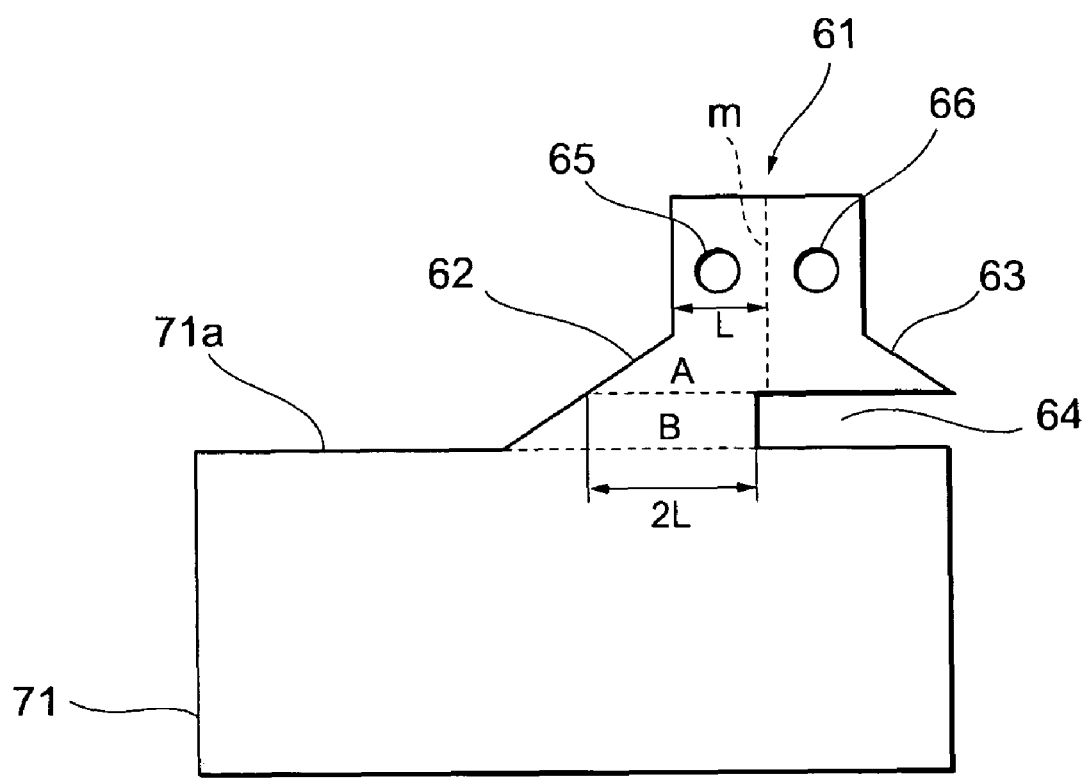
FIG. 3 is a developed view of the terminal plate in FIG. 2.
Figure 4:
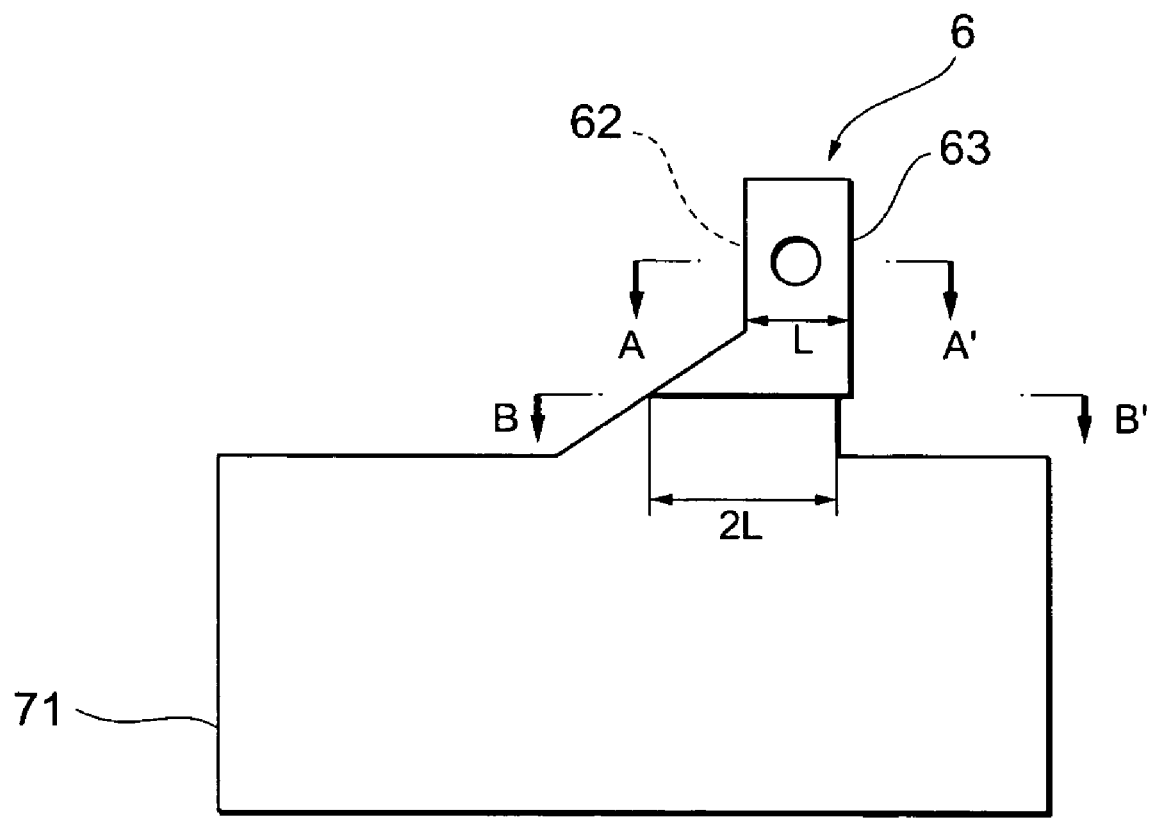
FIG. 4 is a plan view of the terminal plate in FIGS. 1 and 2, and illustrates a state in which the extension in FIG. 3 has been bent.

Next, the shape of, and the method for forming, the output terminal 6 will be described in detail through reference to FIGS. 3 to 5. FIG. 3 is a developed view of the terminal plate 7 in FIG. 2.

As shown in FIG. 3, when the output terminal 6 is in an expanded state, the terminal plate 7 is in the form of a flat plate or a thin plate, and comprises the collecting section 71 and an output terminal forming portion 61 that is extended from part of the peripheral edge of the collecting section 71.

The collecting section 71 and the output terminal forming portion 61 are punched out in the shapes shown in FIG. 3 in a press working step. If the collecting section 71 has a plurality of side faces, the side face from which the output terminal forming portion 61 extends may be any of these side faces, but in this embodiment, it is formed so as to extend from a side face 71a, which is on a long side, out of the four side faces of the substantially rectangular collecting section 71.

The output terminal forming portion 61 has a main part 62 that is continuously extended from the side face 71 a of the collecting section 71, and an extension 63 that is continuously extended from part of the peripheral edge of the main part 62. The extension 63 is formed such that matches up with part of the main part 62 when bent with respect to the main part 62. Also, a notch 64 is provided between the extension 63 and the collecting section 71, and this allows the extension 63 to be bent back toward the main part 62 side (see FIG. 4).

The main part 62 is extended from the side face 71 a so as to protrude in the opposite direction from the collecting section 71, and is formed such that its length 2L on the proximal end side connected to the collecting section 71 is greater than (double, for example) its length L on the distal end side. Also, the main part 62 comprises a region A (first main part region) that is across from the extension 63 when the extension 63 is bent along a connecting line m that connects to the main part 62 (the boundary between the main part and the extension), and a region B (second main part region) that corresponds to the notch 64 and is not across from the extension 63.

The main part 62 and the extension 63 have connecting portions 65 and 66 formed at symmetric locations around the connecting line m and passing through in the cell stacking direction, and this allows the connection of a specific terminal (not shown). The electricity (charge, power) collected by the terminal plates 7 is taken off from the connecting portion 65 (66) of the output terminal 6, so at this portion the output terminal 6 is formed so as to ensure the minimum required cross sectional area.

Figure 5A:
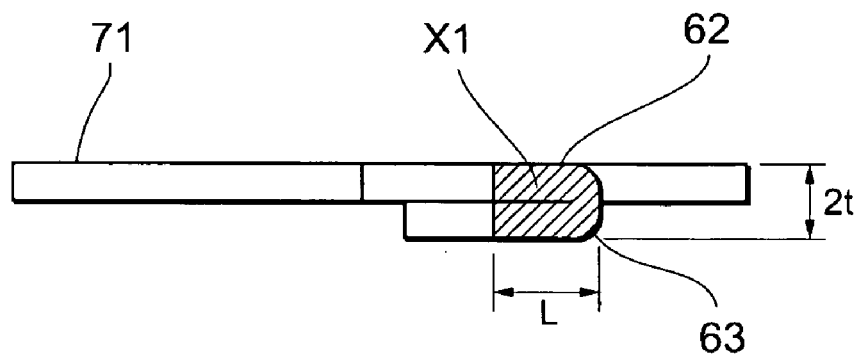
FIG. 5A is a cross section along the A-A' line in FIG. 4.

The cross sectional area required by the output terminal 6 is determined unconditionally by the power with which the output terminal 6 will be used. Here, we will let X1 be the cross sectional area of the output terminal 6 (the area of a cut-out following a line (plane) A-A' parallel to the side face 71a in the connecting portions 65 and 66). As shown in FIG. 5A, if we let X1 be the cross sectional area of the connecting portion 65, L the length, and t the plate thickness, the cross sectional area X1 is calculated from "$X1 = L \times 2\,t$."

Meanwhile, in the region (continuous region) B that is continuous from the proximal end side of the main part 62 connecting to the collecting section 71, to the output terminal 6, it is necessary to ensure a cross sectional area that is at least equal to the cross sectional area required by the output terminal 6 in order for electricity (charge, power) to flow from the collecting section 71 to the output terminal 6.

In this embodiment, the continuous region B corresponds to the notch 64 and is not bent and crimped, so there is no increase in the plate thickness as there is with the output terminal 6, and the plate thickness is the same as that of the collecting section 71. Thus, if the length of the continuous region B is made the same as the length of the output terminal 6, the cross sectional area of the continuous region B will be smaller, making it difficult to ensure the same cross sectional area as that of the output terminal 6. In view of this, in this embodiment, the required cross sectional area of the continuous region B is ensured by changing the length, rather than by increasing the plate thickness.

Figure 5B:
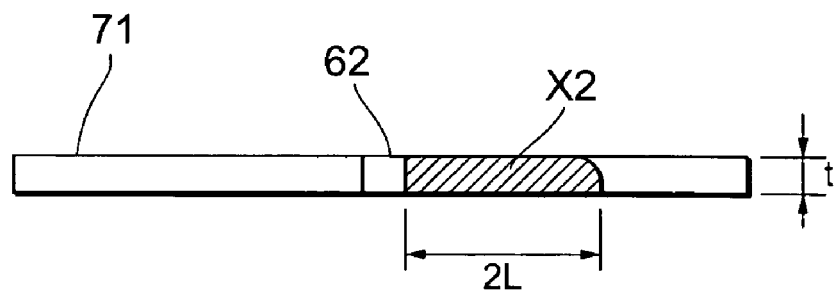
FIG. 5B is a cross section along the B-B' line in FIG. 4.

More specifically, the length 2L on the proximal end side of the main part 62 connected to the collecting section 71 is set to be greater than (double, for example) the length L at the connecting portion 65 of the output terminal 6. As shown in FIG. 5B, if we let X2 be the cross sectional area of the continuous region B, 2L the length, and t the plate thickness, the cross sectional area X2 is calculated from "$X2 = 2L \times t$," and is equal to the cross sectional area X1 of the output terminal 6.

With the terminal plates 7 configured in this way, and the fuel cell 1 that is equipped with the same, since the output terminals 6 are formed by bending the output terminal forming portion 61 extending from the collecting section 71 and crimping the opposing faces, the thickness of the output terminals 6 can be increased even though the collecting section 71 is thin. Thus, it is possible to reduce plate thickness while still ensuring the cross sectional area required to maintain good rigidity and high-voltage resistance.

Also, in the region (continuous region B) of the main part 62 that does not come into contact as a result of bending, a cross sectional area that is equal to that of the output terminal 6 can be ensured by increasing the length of this region. Thus, plate thickness can be reduced while ensuring even more easily the cross sectional area that is required to maintain good rigidity and high-voltage resistance.

Second Embodiment

Figure 6:
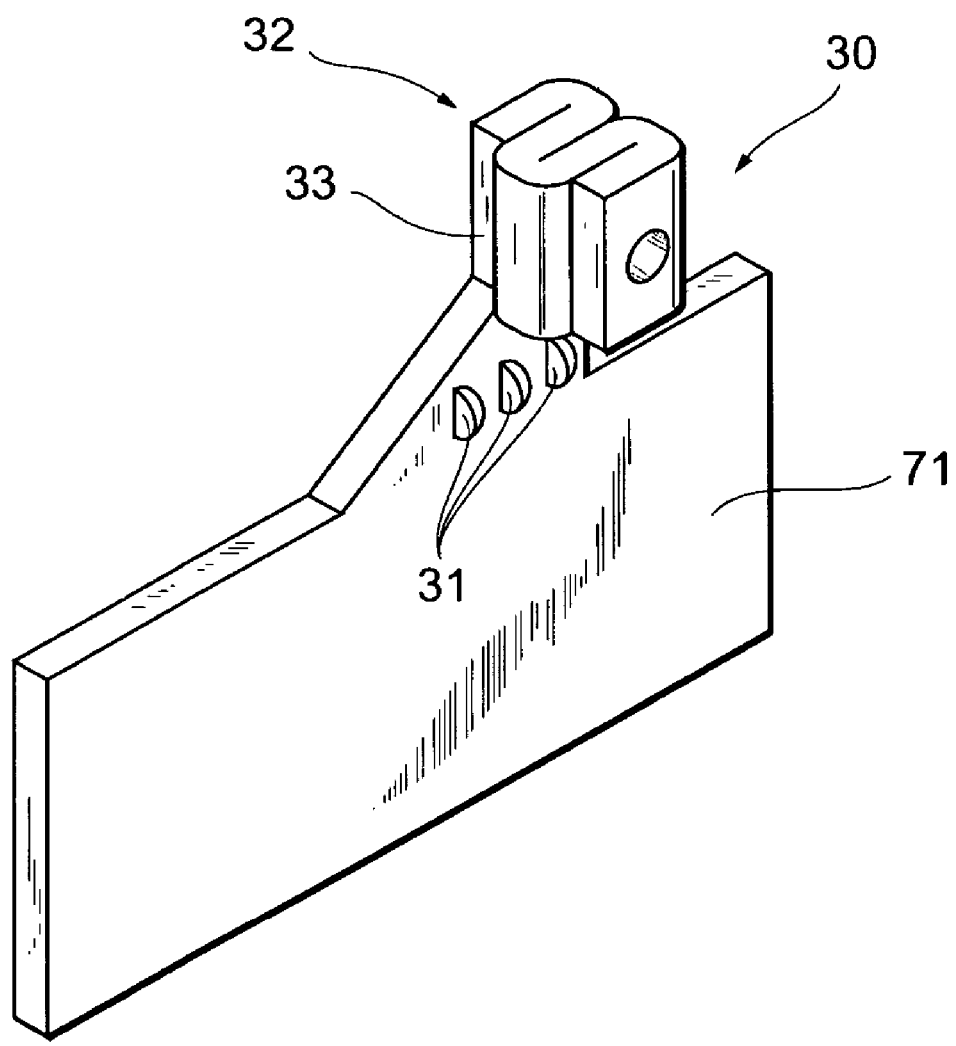
FIG. 6 is an oblique view illustrating a second embodiment of the collecting plate pertaining to the present invention.

A second embodiment of the collecting plate pertaining to the present invention will now be described through reference to FIG. 6. The only differences in this second embodiment from the first embodiment discussed above are that an output terminal forming portion 33 is bent a plurality of times to form an output terminal 32, and that rigidity increasing means 31 is provided to the output terminal forming portion 33, with the rest of the constitution being the same as in the first embodiment.

In the first embodiment above, an example was described in which the plate thickness of the collecting section 71 was only half that the conventional thickness, and the output terminal 6 was formed by bending the output terminal forming portion 61 just one time, but in this second embodiment, a situation will be described in which the plate thickness of the collecting section 71 is even thinner than in the past (such as one-fourth) in an effort to further reduce the thermal capacity and weight of the terminal plates.

Specifically, when the plate thickness of the collecting section 71 is reduced, the output terminal forming portion 33 (extension) is bent and the various opposing faces are brought into contact with each other until the plate thickness required of the output terminal 32 is reached. If the collecting section 71 is only one-fourth the conventional thickness, then the output terminal 32 having the same plate thickness as usual can be formed by bending the output terminal forming portion 33 (extension) three times as shown in FIG. 6.

However, the thinner the collecting section 71 is made, the weaker is the base portion of the output terminal 32 (the region continuous from the proximal end side connecting to the collecting section 71, to the output terminal 6), and the more risk there is of damage or deterioration.

In view of this, a protruding member 31 (such as ribs) is provided as rigidity increasing means to the proximal end of the output terminal forming portion 33 connecting to the collecting section 71, in the terminal plate 30 (collecting plate) of this embodiment. The ribs 31 are formed on the side across from the single cells 2 or the end plate 9 in order to prevent distortion of the terminal plate 30.

With the terminal plate 30 pertaining to the present invention, the plate thickness of the collecting section 71 is reduced even further, and as a result, despite the fact that the plate thickness of the proximal end of the output terminal forming portion 33 connecting to the collecting section 71 was reduced even further, the proximal end was reinforced by the ribs 31, and this maintained the rigidity of the portion between the collecting section 71 and the output terminal 32.

Third Embodiment

A third embodiment of the collecting plate pertaining to the present invention will now be described through reference to FIG. 7. The only differences in this third embodiment from the first embodiment discussed above are that an output terminal 52 is formed without bending an output terminal forming portion 51, and that rigidity increasing means 53 is provided to the output terminal forming portion 51, with the rest of the constitution being the same as in the first embodiment.

Specifically, a terminal plate 50 (collecting section) in this embodiment comprises the rigidity increasing means 53, in the form of a kind of buttress, provided to the proximal end 54 of the output terminal forming portion 51 connecting to the collecting section 71. As shown in FIG. 7, the width L1 of the proximal end 54 of the collecting section 71 in the planar direction (the lengthwise direction of the collecting section 71 in FIG. 7) and the width L0 of the output terminal 52 in the planar direction (a direction parallel to the lengthwise direction of the collecting section 71 in FIG. 7) are in a relation of L0<L1, so the rigidity increasing means 53 has a structure in which the width L1 of the proximal end 54 is formed greater than the width L0 of the output terminal 52.

With the terminal plate 50 pertaining to the present invention, since the proximal end 54 of the output terminal forming portion 51 (the base portion of the output terminal 52) is formed wider, even though the plate thickness of the collecting section 71 is reduced, the rigidity of the portion between the collecting section 71 and the output terminal 52 (the base portion of the output terminal 52) can be increased.

The present invention is not limited to the embodiments discussed above, and various modifications are possible without deviating from the gist thereof. For example, in the third embodiment the output terminal 52 was formed without bending the output terminal forming portion 51, but the rigidity increasing means 53 can, of course, also be applied to collecting plates such as the terminal plates 7, 30 in which the output terminals were formed by bending as described in the first and second embodiments above.

Figure 7:
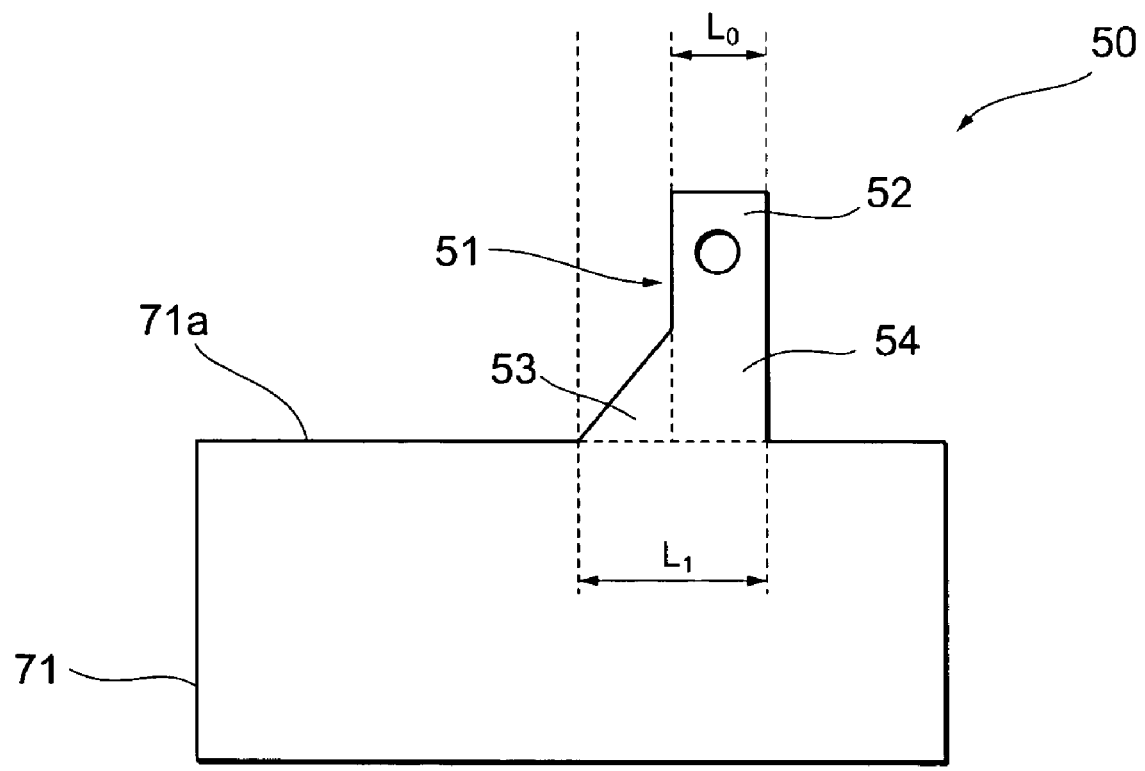
FIG. 7 is an oblique view illustrating a third embodiment of the collecting plate pertaining to the present invention.

Also, in FIG. 7 the width L0 of the output terminal forming portion 52 in the planar direction was less than the width L1 of the proximal end 54. This was intended to reduce weight and maintain high-voltage resistance with a wide proximal end 54 by reducing the width of the output terminal forming portion 52. Thus, instead of the structure shown in FIG. 7, a structure may be employed in which the width is L0=L1, or in which the width is L0>L1. In this case, a reduction in weight may be achieved by making a slit or hole (neither of which is shown) in the output terminal forming portion 52 so as to suppress any increase in the weight of the output terminal forming portion 52.

Furthermore, a situation in which the collecting plate pertaining to the present invention was applied to terminal plates of a fuel cell was described in the above embodiments, but the present invention is not limited to this, and can also be applied to the separators of a fuel cell, for example.

Furthermore, in the first embodiment above, a situation was described in which the extension 63 extending from the main part 62 was bent in the direction of the main part 62 at the bending line m perpendicular to the side face 71a, but the direction in which the extension 63 is bent is not limited to this.

Figure 8:
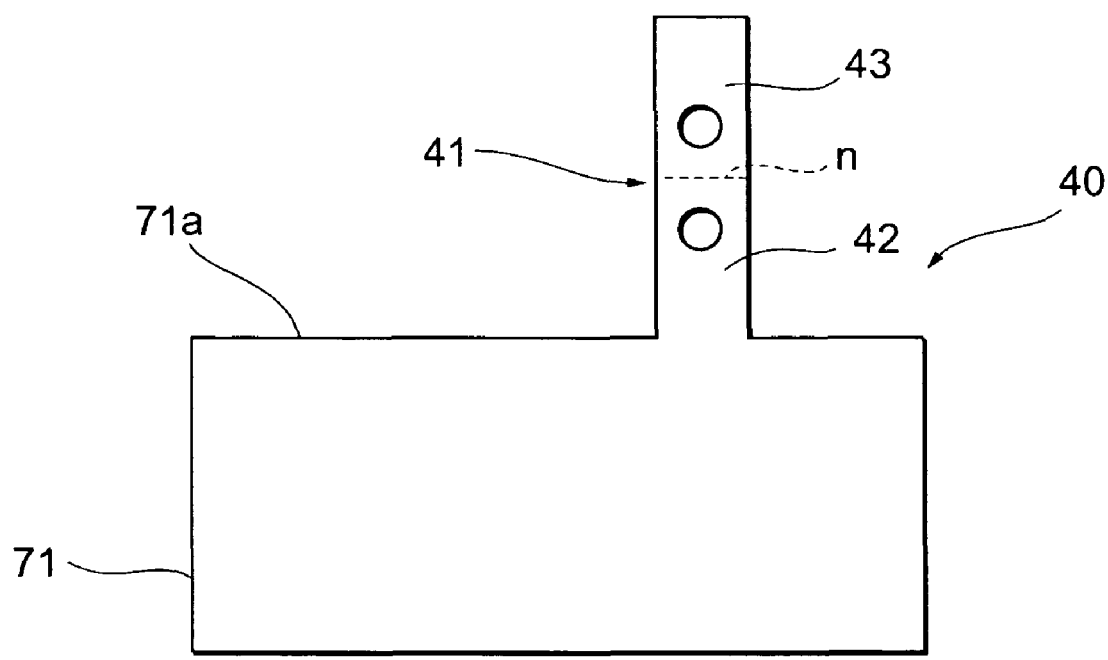
FIG. 8 is an oblique view illustrating another embodiment of the collecting plate pertaining to the present invention.

For instance, as shown in FIG. 8, the constitution may be such that the bending is performed along a bending line n (the boundary between the main part and the extension), which is parallel to the side face 71a on the distal end side away from the proximal end side of a main part 42 of an output terminal forming portion 41. In this case, an output terminal 40 is formed by bending the distal end side of an extension 43 around the bending line n until it is opposite the proximal end side of the main part 42, and crimping these together.

INDUSTRIAL APPLICABILITY

With the collecting plate, the fuel cell in which it is used, and the method for manufacturing these pertaining to the present invention, it is possible to reduce weight and thermal capacity while still maintaining good rigidity and high-voltage resistance, so these can be widely utilized in devices, moving objects, electric motors, equipment, and so forth in which fuel cells are used.

I claim:

1. A collecting plate used in a stacked fuel cell, comprising:
    a collecting section; and
    an output terminal that is electrically connected to the collecting section and has a thickness that is greater than the thickness of the collecting section,
    wherein the collecting section and the output terminal are formed from a single sheet member,
    the output terminal is provided at an output terminal forming portion that extends from the collecting section, and
    the output terminal is formed by bending the output terminal forming portion so that opposing faces come into contact and a first surface of the output terminal forming portion that is positioned on a first side of a bend is flush with a second surface of the terminal forming portion that is positioned on a second side of the bend.

2. The collecting plate according to claim 1, wherein the collecting section and the output terminal are made of metal.

3. The collecting plate according to claim 1, wherein the output terminal forming portion has rigidity increasing means provided to the proximal end connected to the collecting section.

4. The collecting plate according to claim 3, wherein the rigidity increasing means is formed such that the width of the proximal end in the planar direction of the collecting section is greater than the width of the output terminal in the planar direction.

5. The collecting plate according to claim 3, wherein the rigidity increasing means comprises a protruding member provided so as to protrude from the proximal end.

6. A fuel cell, comprising a separator or terminal plate provided with the collecting plate according to claim 1, wherein the collecting plate is applied to the separator or terminal plate.

* * * * *